United States Patent [19]

Korsch

[11] 4,057,381

[45] Nov. 8, 1977

[54] ROTARY PRESS

[75] Inventor: Wolfgang Korsch, Berlin, Germany

[73] Assignee: Emil Korsch, Spezialfabrik fur Komprimiermaschinen, Berlin, Germany

[21] Appl. No.: 764,077

[22] Filed: Jan. 31, 1977

[30] Foreign Application Priority Data

Feb. 4, 1976 Germany ............................ 2604648

[51] Int. Cl.[2] .......................... B29C 3/02; B30B 11/08

[52] U.S. Cl. .................................... 425/345; 425/355; 425/352; 425/356

[58] Field of Search ............... 425/344, 345, 352, 353, 425/354, 355, 356

[56] References Cited

U.S. PATENT DOCUMENTS

| | | | |
|---|---|---|---|
| 1,624,904 | 4/1927 | Claus | 425/344 X |
| 3,507,009 | 4/1970 | Comly | 425/345 |
| 3,533,360 | 10/1970 | Kibbe | 425/345 X |
| 3,559,244 | 2/1971 | Grether et al. | 425/345 X |
| 3,663,147 | 5/1972 | Maekawa et al. | 425/345 |

*Primary Examiner*—J. Howard Flint, Jr.
*Attorney, Agent, or Firm*—Max Fogiel

[57] ABSTRACT

A rotary press with a rotary driven matrix table for holding matrixes having boreholes. During rotation of the matrix table, top and bottom dies are moved in their axial direction towards and away from each other for pressing injected moldable material in the boreholes of the matrix. For production of profiled articles, the bottom and/or top dies are constructed as one outside and at least one inside die which are movable independently of each other. For pressing movement of the outside and inside dies, at least one profiled press roller is provided to assign different pressing paths to the outside and inside dies. The press rollers are provided with a rotary deep-cut groove for guiding the inside die to which a nose-shaped guide head is assigned for engaging the groove. The press rollers are constructed as two exterior disks for guiding the guide surfaces, and one interior disk for guiding the inside die by means of the nose-shaped guide head. The interior disk is located eccentrically, with the eccentricity being adjustable.

6 Claims, 8 Drawing Figures

ROTARY PRESS

BACKGROUND OF THE INVENTION

The present invention relates to a rotary press with a rotary driven matrix table holding matrixes and with bottom and top dies. During rotation of the matrix table, these dies move in their axial direction towards and away from each other and press injected moldable material in boreholes of the matrix.

With known conventional rotary presses of this type, ordinarily normal stampings (blanks) of uniform thickness, particularly tablets, are produced. Solid top and bottom dies are being used. The press pressure is applied from one or both sides. With solid tablet-shaped stampings (blanks) a homogeneous compression (increase in density) is obtained when the known rotary presses are used.

When, however, profiled stampings or extrusions are to be produced which might be cup-shaped, for example, one must use profiled dies. Due to different press paths in the area of the walls and in the area of the bottom of the cup-shaped blank, different densities result. A desired homogeneous compression (increase in density) cannot be achieved. This is a considerable disadvantage with industrial blanks since there a high degree of precision with uniform material density, i.e., homogeneous compression throughout the entire cross-section of the blanks, must be achieved. Examples of such blanks are insulators for electrical articles which are made of ceramic material, for example aluminum oxide.

It is already known in the art how to manufacture such parts on mechanical or hydraulic presses (eccentric presses) which operate with split (divided) tools. In each case, only one top and one bottom tool is used so that with relatively high speeds of these presses, only a small production of blanks per unit time is possible.

It is, therefore, an object of the present invention to improve rotary presses of the initially mentioned type in such a way as to make possible the manufacture of profiled blanks of uniform material density throughout the entire cross-section with a high number per unit time.

Another object of the present invention is to provide an improved rotary press of the foregoing character which is substantially simple in construction and may be economically fabricated.

A further object of the present invention is to provide a rotary press, as described, which may be easily maintained and have a substantially long service life.

SUMMARY OF THE INVENTION

The objects of the present invention are achieved by providing that the bottom and/or top dies for the manufacture of profiled stampings (blanks) comprise one outside and at least one inside die which can be moved independently of each other. For the press movement of the outside and inside die, at least one profiled press roller is provided which assigns different press paths to the outside and inside dies. Through this construction of the rotary press, in accordance with the present invention, profiled blanks of uniform material density at a high rate of production per unit time can be manufactured. Either the bottom dies alone or the top dies alone or jointly both bottom and top dies may be constructed in accordance with the present invention. The construction of the top and bottom dies depends solely on the geometric shape of the blank to be produced. With all possible embodiments of the present invention, a blank or uniform density throughout its entire cross-section can be produced by assigning, based on the profiled press rollers of the present invention, different pressure paths to the outside and inside dies so that the compression varies in intensity in the exterior or interior region of the blank. Because of the high rate of production of the rotary press per unit time, large quantity can be combined with high quality of the blanks.

In a further embodiment of the present invention, the press rollers are provided with a peripheral deep-cut groove for guiding the inside die to which a nose-shaped guide head for engaging the groove is assigned. The lateral peripheral surfaces of the press rollers carry the outside die. In a particularly preferred design, the press rollers comprise two exterior disks for guiding the outside die and an interior disk for guiding the inside die by means of the nose-shaped guide head. By suitable selection of the diameter of the interior disk, by replacing the interior disk, different pressure paths of the outside and inside dies relative to each other can be achieved. In a most preferred construction, the interior disk is eccentric and its eccentricity is adjustable. This makes possible continuously variable regulation of the press paths of the inside and outside dies relative to each other.

In another embodiment of the invention there are located inside the outside die two inside dies of which one is hollow and actuated by the press roller, and the other comprises a center punch which is fastened to a holder passing through the hollow inside die and the hollow outside die in a slotted hole; this holder is rigidly connected to the matrix table.

Finally, in a further embodiment of the present invention, there is assigned to each outside and inside die a roller guidable in separate outside guides. These rollers are guidable independently of each other in guides, rigidly attached to the frame, and located on the periphery of the matrix table outside and inside the dies. As a result, already during the filling and preliminary pressing, a different movement of the outside and inside dies relative to each other can be effected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
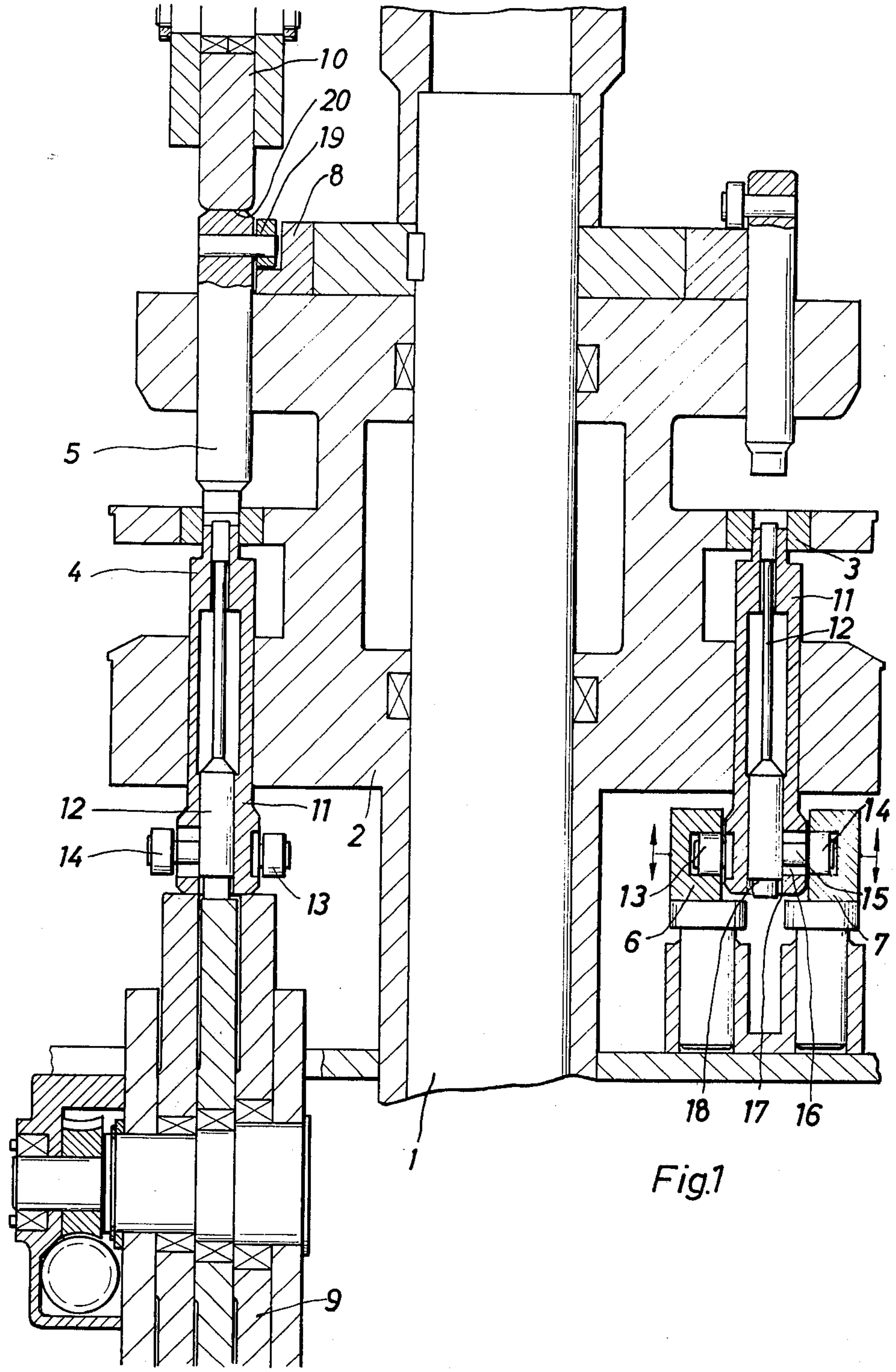
FIG. 1 shows a vertical section through the matrix (die) table of the rotary press.

The rotary press comprises a rotary matrix table 2, rotating about a vertical frame-fixed shaft 1 and driven by a drive (not shown in detail), with matrixes 3 and with top and bottom dies 4, 5. During the rotation of the matrix table 2 these dies 4, 5 move in their axial direction towards and away from each other and press the injected moldable material in the borehole of matrix die 3. The movement of the bottom and top dies 4 and 5 proceeds partially via guides 6, 7, 8 and partially via press rollers 9, 10, 25, 26. FIG. 1 shows the main press roller 9 for the bottom dies 4 and the main press roller 10 for the top dies 5.

The bottom dies 4, shown in FIG. 1, comprise an outside die 11, which is hollow, and an inside die 12 which moves inside the hollow outside die. The inside die 12 comprises a lower solid shaft section and an upper thinner spike which constitutes the actual die head. The inside die can be moved independently of the outside die 11. The movement of the dies 11, 12 proceeds via rollers 13, 14 engaging the guides 6, 7. Rollers 13 are located on the outside dies 11 and rollers 14 on the inside dies 12. The shafts 15 of rollers 14 can move in slotted holes 16 of the outside dies 11.

The outside dies 11 have lower guide surfaces 17 for contacting the press rollers, the main press roller 9 and the preliminary press roller 25. The inside dies 12 have nose-shaped guide heads 18 which also are actuated by the press dies 9, 25, particularly the main press roller 9.

The top dies 9 are of one-piece construction and guided by guide 8 via rollers 19. In the press position, the press surfaces 20 of top dies 5 work together with the peripheral surface of the main press roller 10. The top dies 5 may also be made in sections corresponding to bottom dies 4 (not shown).

The guides 6, 7, located on the periphery 4 of the matrix table 2 outside and inside the bottom die 4, for the rollers 13, 14 of the outside and inside dies 11 and 12 are located on the frame. For individual sections of guides 6, 7 there are provided tables 22, adjustable via worm wheel drives 21, on which are located the guides 6, 7 which can be adjusted independent of each other.

The main press roller 9 and the preliminary press roller 25 may be provided (in a simple embodiment not shown) solely with a peripheral deep-cut groove for guiding the nose-shaped guide heads 18 of inside dies 12, whereas the guide surfaces 17 of the outside dies 11 are guided along the outer periphery of press rollers 9, 25.

Figure 3:
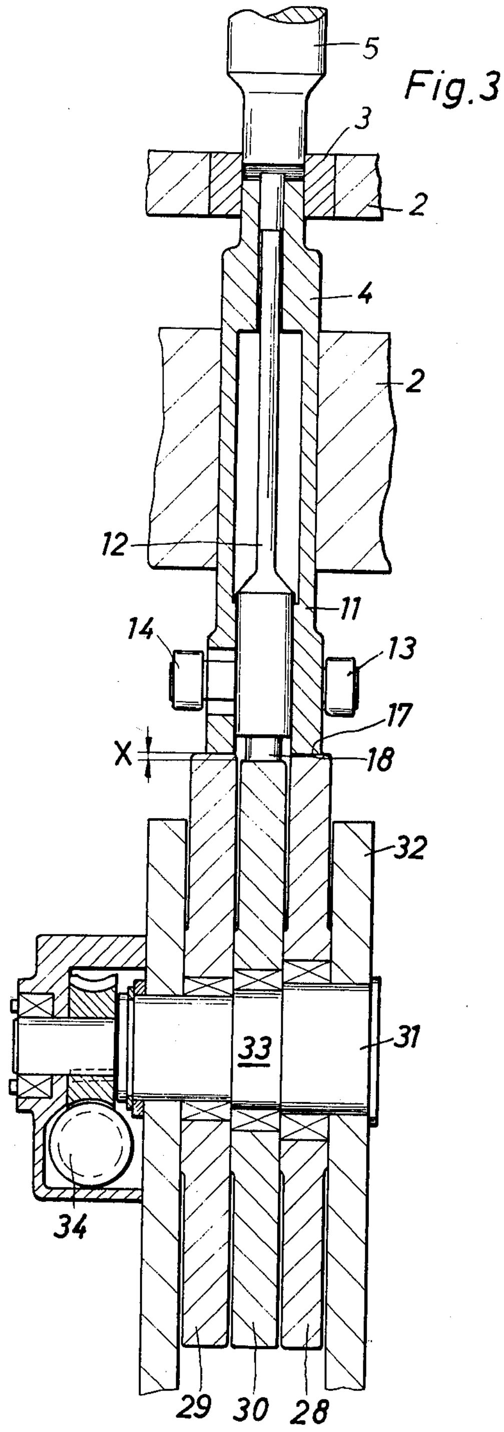
FIG. 3 shows a vertical section through a bottom die, comprising outside and inside die, and the main press roller.

In the special embodiment in accordance with the present invention of the main press roller 9 (FIG. 3), it is composed of two exterior disks 28, 29 for guiding the guide surfaces 17 of the outside dies 11 and one interior disk 30 for guiding the guide heads 18 of inside dies 12. The disks 28, 29, 30 are mounted on a shaft 31 which passes throughside sections 32 which are vertically adjustable on the frame of the rotary press. The disks 28, 29, 30 are freely rotatable between the side sections 32. The interior disk 30 is mounted on an eccentric 33 which is part of shaft 31. The position of eccentric 33 relative to the contact plane of dies 4 can be adjusted by means of a worm drive 34 in such a way that in the area of the contact plane of dies 4, a variable difference X exists between the surface of disks 28, 29 and the eccentric disc 30. Thus a variable press path of the outside and inside dies 11 and 12 relative to each other can be set (adjusted). The preliminary press roller 25 can be constructed the same way as the main press roller so that a separate description of this press roller is not necessary.

Through the press surfaces of outside and inside dies 11 and 12 of each bottom die, which surfaces can be adjusted differently under the action of the preliminary and main press rollers 25 and 9, different press paths can be assigned to the outside and inside dies 11 and 12, in order to form profiled stampings (blanks) with the same material thickness. FIG. 5 shows examples of such stampings. Sample *a* was produced with a one-part solid top die 5 and a bottom die 4 which was split in accordance with the present invention. With sample *b* an additional center punch is used as described below. With embodiments *c* bottom and top dies 4, 5 were equipped with dies in accordance with the present invention with outside and inside dies 11 and 12. With embodiment *d*, an additional center punch was used.

Figure 4:
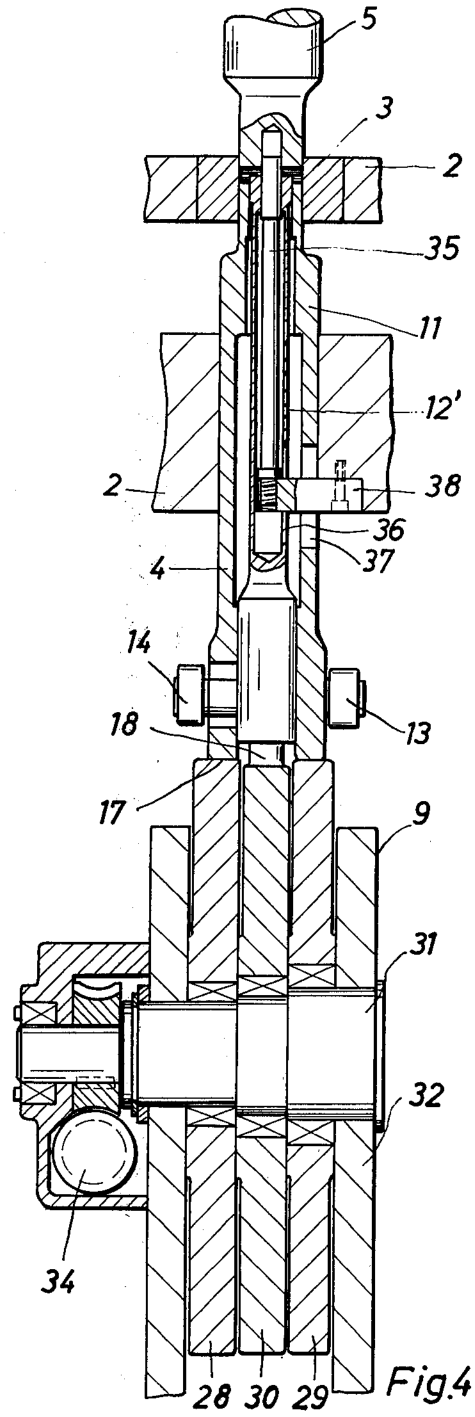
FIG. 4 is a representation, corresponding to FIG. 3, of a bottom die, comprising an outside die and two inside dies.
Figure 5A:
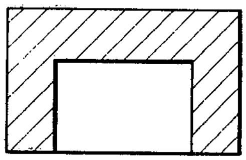
FIG. 5 cross-sections through four different forms of stampings.
Figure 5B:
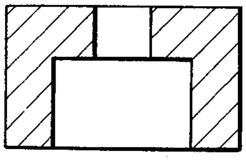
Figure 5C:
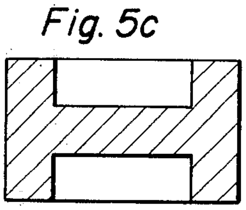
Figure 5D:
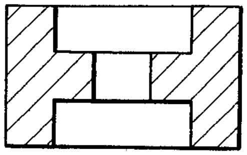

The arrangement of the center punch 35 is shown in FIG. 4. Inside the outside die 11, two inside dies 12' and 35 are provided, of which the inside die 12' is hollow and can be actuated by the main press roller 9 in the manner described above. The other inside die, the center punch 35, is fastened to a holder 38 passing through the hollow inside die 12' and the outside die 11 in slotted holes 32, 37; this holder is rigidly connected to the matrix table.

Figure 2:
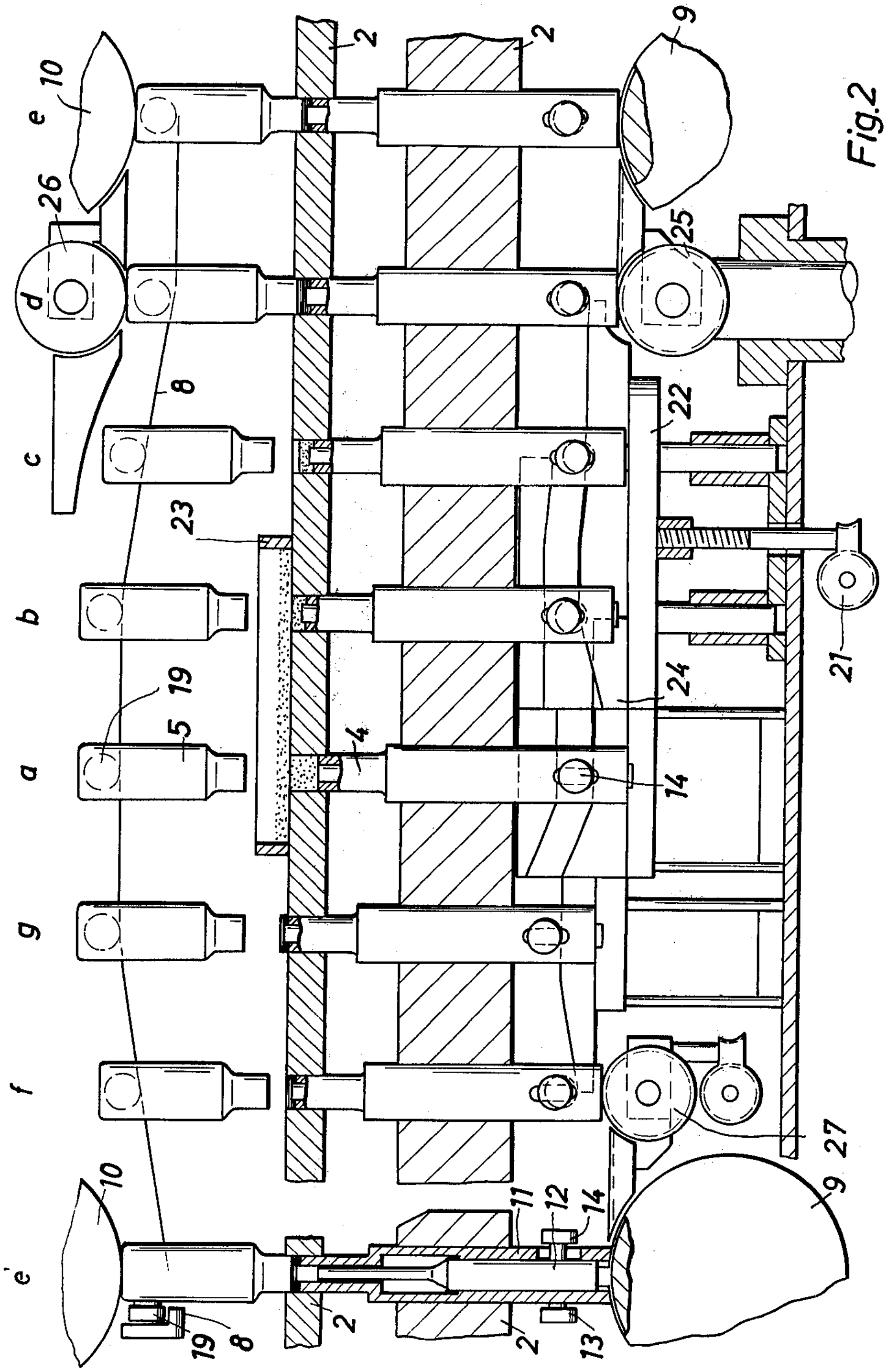
FIG. 2 shows a development of the matrix table in the area of the upper and lower dies.

The various positions of the bottom and top dies 4, 5 are explained by means of FIG. 2. It shows a development of the periphery of the matrix table 2 in the regions of the die guides. In the position a, the top die 5 is lifted by means of roller 19, guided by guide 8, to its upper position. The bottom die 4 is pulled down to its bottom position under the action of rollers 13, 14 which engage guides 6, 7. There is the possibility of pulling both the outside and the inside dies 11 and 12 individually to different bottom positions. In position a, the dies 4, 5 are in the vicinity of a supply container 23 which is filled with the material for the stamping (blank). The borehole in the matrix is filled.

Guided by guides 6, 7 and 8, the dies 4, 5 upon further rotary movement of matrix table 2 get to position *b*. By vertically adjustable excess metering rails 24, the desired volume ratio is set via the outside and inside dies 11 and 12 of the bottom die 5. The excess material is pushed back into the supply container 23. As it appears in position *b*, the inside die 12 with its upper surface is slightly lifted above the upper surface of the outside die 11 in order to form a cup-shaped stamping (blank) or extrusion.

During a further rotary movement of the matrix table 2 to position *c*, the outside and inside dies 11 and 12 of the bottom die 5 are jointly pulled down so that during immersion of the top die 5 into the borehole of matrix 5 there will not be a material loss during venting.

In position *d*, the dies 4, 5 get into the area of the preliminary rollers 25, 26 after the rollers 13 and 14 of the bottom die 4 have left the area of the guides 6 and 7. Here there is a preliminary pressing and venting of the material by means of preliminary rolls 25, 26 which act on the top die 5 and the bottom die 4. The height of the preliminary press roller 25 for the bottom die 4 is adjustable. Its construction is the same as the main press roller.

In position e, the actual pressing (molding) of the material by means of main press rollers 9 or 10 into the desired shape takes place. The main pressing (molding)

by means of main press rolls 9 and bottom die 4 comprising outside and inside dies 11 and 12 has been described previously. The position *e'* shown on the left-hand side of FIG. 2 shows the position *e* of dies 4, 5 in a position rotated by 90° out of the plane of the drawing.

In position *f*, the top die 5 is lifted and the bottom die 4 is released by a height-adjustable release roller 27 and shifted vertically upward.

Between position *f* and position *g*, the bottom die is lifted under the influence of curves on which rollers 13, 14 travel and the finished molding is expelled. Depending on the type of moldings, different discharge paths may be traversed as a function of the inside and outside discharge (explusion) curvc.

In place of rollers 13, 14, an outwardly projecting slide ring may be provided for the shank of inside die 12. This can be guided in a special slide ring guide. The shank of the outer die 11 may be equipped with a standard shank head as is known from the conventional rotary presses. With another variation, the shank of one die may be equipped with a roller and the shank of the other die with a slide ring. With another variation, a grooved inclined plane may be located in the press position, with the guide head of the inside die traveling in the groove and the guide surface of the outside die traveling along the inclined plane. Finally, the movement of the shank of inside die 11 might be initiated by hydraulic or pneumatic elements.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A rotary press comprising: a rotary driven matrix table for holding matrixes with boreholes; top and bottom dies; means for moving said dies in their axial direction towards and away from each other during rotation of the matrix table for pressing injected moldable material in said boreholes of the matrix; at least one of said dies for production of profiled articles comprising one outside and at least one inside die element, said outside and inside die elements being movable independently of each other; and at least one profiled press roller for directing said outside and inside die elements to different pressing paths for pressing movement of said outside and inside die elements.

2. The rotary press as defined in claim 1 including a nose-shaped guide head associated with the inside die element, said press roller having a rotary deep-cut groove for guiding said inside die element associated with said guide head, said guide head engaging said groove.

3. The rotary press as defined in claim 1 wherein said press roll comprises two exterior disks for guiding guide surfaces and one interior disk for guiding said inside die element, and a nose-shaped guide head associated with said inside die element, said interior disk guiding said inside die element by said nose-shaped guide head.

4. The rotary press as defined in claim 3 wherein said interior disk is located eccentrically; and means for adjusting the eccentricity of said interior disk.

5. The rotary press as defined in claim 1 including two inside die members within said outside die element, one of said inside die members being hollow; means for actuating said hollow die member by said press roller, the other one of said die members comprising a center punch; a holder fastened to said center punch and passing through the hollow opening of said inside die member, said outside die element having slotted holes for the passage of said holder, said holder being rigidly connected to said matrix table.

6. The rotary press as defined in claim 1 including a roller associated with each of said outside and inside die elements; separate guides for guiding each roller, each roller being guidable independently of another roller, said means for guiding said roller being located on the periphery of said matrix table outside and inside said one die; and a rigid frame support connected to said guide means.

* * * * *